United States Patent [19]

Colarow et al.

[11] Patent Number: 5,543,169

[45] Date of Patent: Aug. 6, 1996

[54] PROTEIN-CONTAINING FOODS HAVING STABILITY TO HEAT-TREATMENT

[75] Inventors: Ladislas Colarow, Savigny; Ernesto Dalan, Blonay; Andrej Kusy, Froideville, all of Switzerland

[73] Assignee: Nestec S.A., Vevey, Switzerland

[21] Appl. No.: 241,472

[22] Filed: May 12, 1994

[30] Foreign Application Priority Data

Jun. 11, 1993 [EP] European Pat. Off. ............ 93109362

[51] Int. Cl.⁶ ................................................. A23J 7/00
[52] U.S. Cl. ..................... 426/662; 426/331; 426/332; 426/573; 426/575; 426/577; 426/614; 426/656
[58] Field of Search .................................. 426/614, 656, 426/331, 332, 573, 575, 577, 662

[56] References Cited

U.S. PATENT DOCUMENTS

| | | | |
|---|---|---|---|
| 2,635,963 | 4/1953 | Glabe | 426/662 |
| 2,819,971 | 1/1958 | Gunthardt | 426/662 |
| 3,391,002 | 7/1968 | Little | 426/662 |
| 4,472,448 | 9/1984 | Haggerty et al. | 426/662 |
| 4,794,015 | 12/1988 | Fujital et al. . | |
| 4,957,768 | 9/1990 | Dutilh | 426/662 |
| 5,079,028 | 1/1992 | Wieske et al. . | |
| 5,160,759 | 11/1992 | Nomera et al. . | |
| 5,314,706 | 5/1994 | Colarow et al. . | |
| 5,393,554 | 2/1995 | Mori et al. | 426/662 |

FOREIGN PATENT DOCUMENTS

| | | |
|---|---|---|
| 0171995 | 2/1986 | European Pat. Off. . |
| 0319064 | 7/1989 | European Pat. Off. . |
| 0328789 | 8/1989 | European Pat. Off. . |
| 91121318 | 10/1992 | European Pat. Off. . |
| 63-214144 | 9/1988 | Japan . |
| 509125 | 1/1993 | Japan . |
| 1525929 | 9/1978 | United Kingdom . |

OTHER PUBLICATIONS

Derwent Database. WPI AN 88–290542, Week 884, Derwent Publications Ltd., London UK; Abstract of Asahi Japanese Patent Document No. 63214144.
Patent Abstracts of Japan vol. 017, No. 270 Abstract of Japanese Patent Document No. 50009125 (1973).
Chemical Abstracts, vol. 93, No. 11, 1980, Abstract No. 112505, p. 574.

*Primary Examiner*—Helen Pratt
*Attorney, Agent, or Firm*—Vogt & O'Donnel, LLP

[57] ABSTRACT

Lysolecithin/polymer compositions of lysolecithin and a polymer of pectin or of a food-quality gum or of mixtures thereof. The compositions, when added to protein-containing food products to be subjected to heating, effect stabilization of protein to heat, and the composition may be combined with an oil for preparation of emulsions with water.

20 Claims, No Drawings

PROTEIN-CONTAINING FOODS HAVING STABILITY TO HEAT-TREATMENT

BACKGROUND OF THE INVENTION

This invention relates to a heat-stabilizing composition for proteins and protein-containing emulsions. The invention also relates to the heat-stabilized product.

Egg yolk is a natural emulsifier commonly used in the preparation of sauces and mayonnaises. However, its commercial use in food products is limited by its tendency to coagulate at relatively low temperatures (65° C.), which results in destabilization of the oil-in-water emulsion followed by a heavy exudation of oil. As a result of this, compositions containing natural egg yolk break up when they are sterilized or when they are heated to their boiling point.

Great Britain Complete Patent Specification No. 1,525, 929 relates to a water-in-oil emulsion containing a phospholipoprotein (for example egg yolk) modified with phospholipase A (PLA). This emulsion is stable if it is treated for 30 minutes at 100° C. However, the major disadvantage is that the egg yolk is enzymatically modified, and the elimination of PLA activity by proteases is not possible because the proteolytic enzyme would modify the proteins of the egg yolk and the PLA on its own could only be deactivated at very high temperatures (160° C.).

European patent application No. 91 121 318.9 filed by applicants on Dec. 12, 1991 relates to a water-in-oil emulsion containing an exogenous lysophospholipid (LPL) emanating from soya. The LPL is prepared from a lecithin fraction with a relatively high content of phosphatidyl choline (PC) which is converted by PLA into lysophatidyl choline (LPC). The PLA is then deactivated by addition of a protease of which the enzymatic activity is reduced by heat treatment. The disadvantage of this solution is that it involves the use of a lecithin fraction rich in PC to obtain a sufficiently high level of LPC. Now, on the one hand, the cost of such a fraction is relatively high and, on the other hand, the procedure involves an additional stage for inactivating PLA. In addition, the presence of free fatty acids in the substrate enzymatically hydrolyzed in situ can impart a taste to the end product.

SUMMARY OF THE INVENTION

The problem addressed by the present invention was to provide a heat-stabilizing composition for proteins which could be obtained from inexpensive compounds directly available on the market without having to carry out an enzymatic treatment.

Accordingly, the present invention relates to a heat-stabilizing composition for proteins and protein-containing emulsions, the composition according to the invention containing lysolecithin and a polymer of glucides selected from pectin, a food-quality gum and mixtures thereof. The composition may contain from 1 mmol to 1700 mmol of LPC per kg of composition.

The present invention also relates to a stabilizing composition for preparing water-in-oil emulsions which comprises an oil which contains lysolecithin and a compound selected from pectin and the food-quality gum. When this composition is subsequently mixed with water, a stable emulsion is obtained without any need for other additives. By oil is meant any animal or vegetable oil based on acyl glycerols.

The present invention also relates to products containing proteins which have been heat-stabilized. The proteins to be stabilized are, above all, egg yolk proteins, although any other type of protein may also be stabilized with the composition according to the invention. Accordingly, the present invention relates to products selected from minced meat, sauces, pizza dough, milk powder, mayonnaise, a cream and egg yolk.

DETAILED DESCRIPTION OF THE INVENTION

Egg yolk, is understood to be any type of egg yolk, commercially available by separation from egg white, for example from chicken eggs, quail eggs or ostrich eggs, the egg yolk being used as such or stabilized with NaCl (8–10%) or sucrose (20%).

Protein-containing emulsions are understood to be any oil-in-water emulsion of food quality, namely sauces, dressings, mayonnaises, enteral food products and creams. Oils are understood to be any food-quality oils, such as soybean oil, sunflower oil, grape oil, peanut oil, corn oil, butter oil and butter fat. In the present description, the definition of the emulsions encompasses powders that can be reconstituted to form emulsions, for example milk powder or mayonnaise powder. Finally, a mixture of minced meat suitable for making hamburgers and pizza dough are also considered to be emulsions.

The lysolecithin used may be both fluid lysolecithin, i.e. containing from 45 to 55% of neutral lipids, and de-oiled lysolecithin, i.e. powder-formlysolecithin.

Fluid lysolecithin contains neutral lipids and complex lipids, the complex lipids being represented by various phospholipids (PL), lyso-PL and phytoglycolipids. The strongest emulsifying activity is attributed to LPC which is the most hydrophilic phospholipid. Like other phospholipids, LPC is active over a wide pH range. Normally, the LPC content of a commercial lysolecithin is from 100 to 500 µmols per gram of the lysolecithin while the molar PC:LPC ratio is from 75:25 to 25:75 and, more typically, of the order of 50:50.

Still in the case of fluid lysolecithin, one embodiment of the invention is a composition containing from 1 to 50 parts of lysolecithin to 1 part of pectin or food-quality gum (parts=parts by weight). The mixture is preferably used in aqueous phase with a water content of 50 to 99% and preferably of the order of 90%. In this case, 1 kg of composition contains from 1 to 100mmols of LPC (this content by weight may be calculated from the molecular weight of LPC as oleyl, namely 521.66).

For certain applications, it is preferable to use lysolecithin in powder form. In cases such as these, fluid lysolecithin is used and has to be freed from oil (de-oiled) accordingly. The most common method is to precipitate the complex lipids in acetone while the neutral lipids soluble in acetone are rejected. A second method is based on the isolation of micelles of complex lipids which are spontaneously formed in hexane by adsorption using liquid column chromatography (German Patent No. 2,915,614). A more recent process involves the use of an ultrafiltration membrane resistant to the solvent which also retains the micelles of complex lipids formed in the hexane while the neutral lipids and free fatty acids are rejected (U.S. Pat. No. 4,240,914). The lysolecithin thus obtained has a flat olfactory profile with no bitter taste. In this case, the LPC content is almost double that for fluid lysolecithin (200 to 100 µmols per gram). The quantitative values of the PC and LPC contents may be determined by the method described by L. Colarow (1990) in J. Planar Chromatography, 3, 228–231 "Quantitative Transmittance Densitometry of Phospholipids After Their Specific Detection with a Molybdate Reagent on Silica Gel Plates".

In this case, the composition according to the invention contains from 3 to 10 parts of lysolecithin in powder form per part of glucide polymer.

The food-quality gum used is preferably selected from xanthan, alginate, carragenate, gum arabic and tragacanth. Xanthan is preferably used.

The presence of pectin is essential for various reasons, more particularly to stabilize certain phospholipids, such as phosphatidyl inositol and phosphatidic acid, which are present in the lysolecithin alongside constituents responsible for the emulsifying function, namely PC and LPC. The pectin used is obtained from the rind of citrus fruits and has a degree of esterification of 30 to 95% and preferably 70 to 72%.

In the case of fluid lysolecithin, the composition is prepared by dissolving the pectin in water at 40° to 80° C., adding the fluid lysolecithin and mixing. This composition may then be pasteurized or sterilized.

In the case of powder-form lysolecithin, it is dissolved in water with the pectin. It may then be used as such in aqueous phase in the same concentrations as indicated above for powder-formlysolecithin, namely from 1 to 100 mmols of LPC per kg of composition; it is pasteurized or sterilized. It is also possible, after adding a maltodextrin, to subject the composition to drying by spray drying or the like to obtain a powder containing from 100 to 350 mmols of LPC per kg of powder and from 5 to 20% of maltodextrin.

In the case of egg yolk, the lysolecithin and the pectin are mixed as described above, egg yolk containing salt or sucrose is added to the resulting aqueous phase and the whole is mixed or homogenized. In this case, from 0.5 to 1.5 g of pectin and from 10 to 20 g of fluid lysolecithin are used per 100 g of egg yolk. This egg-based mixture may then be used in any product requiring egg yolk which it is desired to subject to a heat treatment, such as a UHT treatment.

In the case of minced meat, the object is to retard the coagulation of the proteins and the exudation of liquid phase in order to ensure a uniform transfer of heat during cooking. In this case, the ingredients for hamburgers (minced meat, onions, spices) are mixed with the composition containing fluid lysolecithin. The resulting mixture may be used in various ways. It may be cooked and eaten immediately, cooked and frozen for subsequent reheating or even frozen and cooked in a time convenient to the consumer. Quantities of 10 to 50 g of fluid lysolecithin and 3 to 15 g of pectin may be used per kg of minced meat.

In the case of sauce, for example hollandaise sauce, it is really the egg protein which is heat-stabilized. Sauces with a pH of 3 to 7 may be considered. The method of preparation is normally as follows: a mixture of lysolecithin, pectin and egg yolk is prepared as described above and subsequently mixed with the other ingredients in the usual way. The end product contains from 1 to 3 g of pectin and from 3 to 20 g of lysolecithin (normally in powder form) per kg of sauce.

For pizza dough, the objective is rather to retard coagulation of the proteins in the same way as for minced meat. The dough is prepared by mixing the composition according to the invention with the yeast/flour/water mixture. 1 kg of dough contains from 10 to 50 g of lysolecithin and from 2 to 10 g of pectin.

For mayonnaises, particularly in powder form, the following procedure is adopted. A first mixture of water, pectin (or other food-quality gum), fluid lysolecithin, skimmed milk powder (or whey concentrate) and egg yolk and a second mixture of egg white, maltodextrin, starch, salt and spices are prepared. The two mixtures thus prepared are combined, oil is added, the whole is homogenized for a first time, sterilized and cooled, homogenized for a second time and then spray dried. The product obtained contains from 0.05 to 0.2 g of pectin and from 0.1 to 4 g of fluid lysolecithin per 100 g of powder-form mayonnaise.

In the case of cream, a mixture of whey concentrate, whey and water is homogenized and pectin, fluid lysolecithin, butter oil, salt, egg yolk and water is added and the mixture obtained is homogenized. The product obtained has a pectin content of 1 to 2 g and a fluid lysolecithin content of 5 to 10 g per kg of cream.

In the case of milk powder, it is desired to improve wettability and miscibility during reconstitution. To this end, the following procedure is adopted: a premix of fluid lysolecithin with pectin and water at 80° C. is prepared and then mixed with fresh milk. The resulting mixture is then preconcentrated to 40% dry matter and spray dried in an Egron system or in any other drying system. Where fresh milk is used as the starting material, it has a fluid lysolecithin content of 100 to 1000 ppm and a pectin content of 20 to 200 ppm per liter of milk.

The composition according to the invention may of course have other potential applications, for example for condensed milk, egg yolk in the form of a whole powder or an emulsifying powder, pancakes, quiches, fat-soluble and water-soluble powder-form or liquid antioxidant mixtures and emulsions for infant nutrition based on lipids, milk proteins and hydrolyzed milk proteins.

The fluid lysolecithin content is from 20 to 200 mmols of LPC per kg of composition. The pectin content is from 1 to 10 g/kg.

The following procedure may be adopted to show the presence of LPC in the products according to the invention: all the lipids are extracted by the Folch method (cf. the above-cited article by L. Colarow) and then separated by high-performance thin-layer chromatography (HPTLC) into their classes of phospholipids by the above-mentioned method published in J. Planar Chromatography. After detection with a reagent which does not destroy primulin, the classes of phospholipids are visible under UV light at 366 nm. The LPC content may then be quantified.

The determination of polymers of glucides, such as pectin and xanthan, and the analysis of their composition mentioned in detail in the following official method: Amtliche Sammlung von Untersuchungsverfarhren nach § 35 LMBG, Code L-00.00.13, November 1986.

The invention is illustrated by the following Examples.

EXAMPLE 1

Preparation of de-oiled lysolecithin 225 g of silica gel (size 70 to 230 mesh) are activated for 24 h at 165° C. After cooling, the chromatographic adsorbent is suspended in hexane and introduced into a glass column to establish a bed volume of approximately 450 ml. Commercial lysolecithin (100 g) obtained from soya is suspended in hexane (300 ml) at 50° C. The column is completely charged with the sample which passes through the adsorbent. The elution of the micelles of complex lipids is completed by addition of 300 ml of hexane. The eluate is concentrated to dryness in vacuo. The powder obtained is purged with a stream of nitrogen, represents 48.5 g and contains PL's, LPL's and glycolipids. The LPC concentration is 303 μmols per g. The retention of free fatty acids and the other neutral lipids on the column significantly improves the olfactory and gustative profile of the lysolecithin.

EXAMPLE 2

Egg yolk with pectin 500 mg of pectin of citrus (lemon) origin with a degree of esterification of 68 to 72% are dissolved in 300 ml of deionized water at 80° C. The pectin solution and the egg yolk (100 g) containing 11% of NaCl are mixed at 40° C. to homogeneity and the pH of the sample is adjusted to 4.8 with a solution of acetic acid in water. The sample is then introduced into a homogenizer operated at 400–800 bar/50° C. Other samples respectively containing 1000, 1500, 2136 and 3560 mg of pectin were prepared. Aliquots of the homogenizate obtained are diluted to 100 ml with deionized water and tested for their thermal stability for 10 minutes in boiling water. All the samples coagulate in 0.5 min.

EXAMPLE 3

Egg yolk with fluid lysolecithin

Commercial lysolecithin (5 g) obtained from soya containing 51.5% of neutral lipids and 48.5% of complex lipids, such as PC (146 μmols/g) and LPC (147 μmols/g), is dispersed in deionized water (300 ml) at 60° C. The dispersion is degassed in vacuo, mixed with 100 g of salted egg yolk and then homogenized at pH 4.8, as in Example 2. The same procedure is applied to the same quantity of egg yolk as before, but with 10, 15 and 20 g of fluid lysolecithin. A thermal stability test is carried out as in the previous Example. All the samples coagulate in 0.5 min.

EXAMPLE 4

Egg yolk with pectin and fluid lysolecithin 500 mg of pectin (Example 2) are dissolved in 150 ml of deionized water at 80° C. 5 g of lysolecithin (Example 3) are dispersed in 150 ml of deionized water at 90° C. The two solutions are combined, cooled to 50° C. and mixed with 100 g of salted egg yolk. The acidity of the resulting mixture is adjusted to 4.8, after which the sample is homogenized as described above. The same procedure is repeated for samples containing variable quantities of pectin and lysolecithin as shown in the following Table.

| PEC-TIN | %/ Egg yolk pro-teins | FLUID LYSOLE-CITHIN | | WATER | SALTED EGG YOLK | THERMAL STABILITY Minutes at |
| --- | --- | --- | --- | --- | --- | --- |
| mg | teins | g | mmols | g | g | 100° C. |
| 500 | 3.51 | 5.0 | 0.73 | 300 | 100 | 1.0 |
| 500 | 3.51 | 10.0 | 1.47 | 300 | 100 | 1.5 |
| 500 | 3.51 | 15.0 | 2.20 | 300 | 100 | >10 |
| 1000 | 7.02 | 15.0 | 2.20 | 300 | 100 | >10 |
| 1500 | 10.53 | 15.0 | 2.20 | 300 | 100 | >10 |
| 1500 | 10.53 | 20.0 | 2.93 | 300 | 100 | >10 |

It can be seen that a perfectly heat-stable composition is obtained from a pectin content of 500 mg and a lysolecithin content of 15 g per 100 g of egg yolk.

EXAMPLE 5

Thermal stability of egg yolk at pH 4.5–7

5 ml aliquots of egg yolk containing 1000 and 1500 mg of pectin for 15 g of lysolecithin (Example 4) are separately removed, diluted in 100 ml of deionized water and the pH of each solution is adjusted to values of 4.5, 5, 5:5, 6.0, 6:5 and 6:9, respectively. The thermal stability tests carried out as in Example 2 do not result in coagulation of the samples.

EXAMPLE 6

Egg yolk with pectin and de-oiled lysolecithin 10 g of de-oiled lysolecithin (Example 1) are dispersed in 150 ml of deionized water (90° C.) while 1000 mg pectin are dissolved in the same volume of water at 80° C. The pectin and lysolecithin solutions are combined, brought to 50° C. and added to 100 g of salted egg yolk. The mixture is homogenized and adjusted to pH 4.8. The thermal stability test is carried out in the same way as in Example 2. The procedure is repeated with the same quantity of lysolecithin, but without pectin and with 2000 mg of pectin. The pectin-free sample does not stabilize the egg yolk, coagulation occurring in less than 0.5 minutes. The other two samples withstand the thermal stability test for more than 10 minutes.

EXAMPLE 7

Egg yolk with xanthan and de-oiled lysolecithin 20 g of de-oiled lysolecithin (Example 1) are dispersed in 300 ml of deionized water (90° C.) while 2000 mg and 3000 mg of xanthan are separately dissolved in 150 ml of water at 80° C. The solutions of xanthan (150 ml) and lysolecithin (150 ml) are combined, cooled to 50° C. and mixed with 100 g of salted egg yolk. The thermal stability test is carried out in the same way as in Example 2. The two samples withstand the thermal stability test for more than 10 minutes.

EXAMPLE 8

Sauce obtained from treated egg yolk 6.742 g of lysolecithin de-oiled as described in Example 1 are dispersed in 360 ml of deionized water at 90° C. 674 mg of pectin are dissolved in the same volume of water at 80° C. The two solutions are combined, brought to 50° C. and added to 67.42 g of egg yolk containing 11% of NaCl. Another 6.42 g of NaCl are added to the mixture which is then homogenized with a magnetic stirrer and adjusted to pH 4.8 with an aqueous solution containing 10 ml of acetic acid per 100 ml. The procedure is repeated with 1348 mg and 2022 mg of pectin dissolved in 360 ml of water in the same way as above. The three samples are then homogenized as described in Example 2. The sauce is then prepared from the egg thus obtained in the following manner: 700 g of egg containing 674 mg of pectin are mixed with 250 g of cocoa butter, 15 g of sucrose, 27 g of starch, 2 g of xanthan gum and 5 g of sodium glutamate and homogenized for 10 minutes at 50° C. The acidity of the mixture is adjusted to pH 4.8 as indicated above and the sauce is rehomogenized at 50° C./ 180 bar. Two additional sauces were prepared as described above with pectin contents of 1348 and 2022 mg. The thermal stability test is described in the following Example.

EXAMPLE 9

Thermal stability test 100 g of the sauce obtained in the preceding Example are placed in a Siemens microwave oven and exposed for 120 seconds to a 600 watt microwave field. The three sauces are thermally stable, i.e. show no sign of demulsification, namely exudation of oil, coagulated proteins or phase separation.

EXAMPLE 10

Minced meat

Hamburgers are made from 850 g of minced meat, 150 g of onions and 20 g of spices to which a premix of 25 g of lysolecithin and 5 g of pectin dissolved in 70 g of water is added. Hamburgers weighing approximately 100 g are then prepared. It is found that they can be cooked uniformly without burning and with a water loss of only 20 to 25% (as opposed to 30 to 35% in the case of a conventional hamburger which, on the other hand, is burnt and only 60 to 80% cooked).

EXAMPLE 11

Pizza dough 20 g of lysolecithin and 5 g of pectin are added to 1 kg of pizza dough conventionally prepared from flour, water, salt and yeast. The dough obtained has a fine and well aerated texture and remains elastic and fresh even after storage for 6 months at −20° C. and subsequent reheating, whereas the conventional dough develops a typical "biscuit" texture.

EXAMPLE 12

Powder-form mayonnaise 160 g of pectin, 400 g of fluid lysolecithin, 6 kg of skimmed milk powder and 4 kg of 9% salted egg yolk are mixed in water. A second mixture containing 4 kg of egg white, 20 kg of maltodextrin, 2 kg of starch, 300 g of salt, 1 kg of lemon concentrate and 250 g of glutamate is prepared. The second mixture is solubilized in the first and the whole is adjusted to pH 3.9 with acetic acid. After preheating to 45° C., 50 kg of olive oil are added. The composition is homogenized for a first time, heated for 5 seconds to 95° C., homogenized for a second time and, finally, spray dried.

EXAMPLE 13

Cream 100 g of whey concentrate are mixed with 50 g of salted whey and 850 g of water and homogenized at 50° C. 8 g of pectin, 40 g of fluid lysolecithin, 500 g of butter oil, 50 g of NaCl, 200 g of salted egg yolk and 3200 g of water are added to the cream obtained, the resulting mixture is pasteurized at 85° C. and then homogenized at 50° C.

The cream obtained is thermally stable, i.e. keeps for 3 minutes in the same microwave oven as that used in Example 9.

EXAMPLE 14

Emulsifier based on powdered egg yolk

Lysolecithin (500 g) and 150 g of pectin (or alternatively 150 g of xanthan) are dissolved in 5.0 l of water at 80° C. and the solution is brought to 50° C. for mixing with 5 kg of pasteurized egg yolk with no added NaCl. The mixture is then spray dried. A fine powder is obtained which readily disperses in water and remains suspended therein. The egg yolk thus reconstituted remains uncoagulated for more than 10 minutes at 100° C. whereas egg yolk reconstituted from a commercial powder does not remain in suspension and coagulates in less than 0.5 minutes.

EXAMPLE 15

Emulsion

70% of a lipidic phase (95% of medium chain triglyceride=MCT and 5% of rosemary extract) are mixed with 29.6% of fluid lysolecithin and 0.4% of pectin. 10% of this composition are mixed with 90% of water to form a perfectly stable emulsion.

We claim:

1. A food product comprising a protein-containing food substance having incorporated therein an additive lysolecithin/polymer composition of lysolecithin and a polymer selected from the group consisting of pectin, a food-quality gum and mixtures thereof so that the food substance protein has increased stability to heat-treatment.

2. A food product according to claim 1 wherein the polymer is pectin.

3. A food product according to claim 1 wherein the polymer is selected from the group consisting of pectin, xanthan and mixtures thereof.

4. A food product according to claim 1 wherein the polymer is a gum selected from the group consisting of xanthan, alginate, carraggeenate, gum arabic and tragacanth.

5. A food product according to claim 1 wherein the food substance is a dough.

6. A food product according to claim 5 wherein per kg dough, the lysolecithin is in an amount of from 10 g to 50 g and the polymer is pectin in an amount of from 2 g to 10 g.

7. A food product according to claim 1 wherein the food substance is a minced meat.

8. A food product according to claim 7 wherein the lysolecithin is fluid lysolecithin and the polymer is pectin and wherein per kg minced meat, the lysolecithin is in an amount of 10 g to 50 g and the pectin is in an amount of from 3 g to 15 g.

9. A food product according to claim 1 wherein the food substance is selected from the group consisting of fresh milk, a milk powder, a protein-containing mayonnaise product and a protein-containing cream product.

10. A food product according to claim 1 wherein the food substance is fresh milk, the lysolecithin is fluid lysolecithin and the polymer is pectin and wherein per liter milk, the lysolecithin is in an amount of from 100 ppm to 1000 ppm and the pectin is in an amount of from 20 ppm to 200 ppm.

11. A food product according to claim 1 wherein the food substance is a mayonnaise product in a powder-form, the lysolecithin is fluid lysolecithin and the polymer is pectin and wherein per 100 g mayonnaise product, the lysolecithin is in an amount of from 0.1 g to 4 g and the pectin is in an amount of from 0.05 g to 0.2 g.

12. A food product according to claim 1 wherein the food substance is a cream comprising a whey concentrate and the polymer is pectin and wherein per kg cream, the lysolecithin in an amount of from 5 g to 10 g and the pectin is in an amount of from 1 g to 2 g.

13. A food product according to claim 1 wherein the food substance is a sauce containing egg yolk.

14. A food product according to claim 1 wherein the food substance is a sauce containing egg yolk and the polymer comprises pectin and wherein per kg sauce, the lysolecithin is in an amount of from 3 g to 20 g and the pectin is in an amount of from 1 g to 3 g.

15. A food product according to claim 1 wherein the food substance is an infant nutrition product containing lipids, milk proteins and hydrolyzed milk proteins.

16. An egg yolk product comprising egg yolk having incorporated therein an additive lysolecithin/polymer composition of lysolecithin and a polymer selected from the group consisting of pectin, a food-quality gum and mixtures thereof so that the egg yolk protein has increased stability to heat-treatment.

17. An egg yolk product according to claim 16 wherein the polymer is pectin.

18. An egg yolk product according to claim 16 wherein the lysolecithin is fluid lysolecithin and the polymer is pectin and wherein per 100 g egg yolk, the lysolecithin is in an amount of from 10 g to 20 g the pectin is in an amount of from 0.5 g to 1.5 g.

19. An egg yolk product according to claim 16 wherein the polymer is selected from the group consisting of pectin, xanthan and mixtures thereof.

20. An egg yolk product according to claim 16 wherein the polymer is a gum selected from the group consisting of xanthan, alginate, carrageenate, gum arabic and tragacanth.

* * * * *